No. 679,664. Patented July 30, 1901.
C. E. BLUE.
MACHINE FOR THE MANUFACTURE OF GLASSWARE.
(Application filed Mar. 7, 1898.)
(No Model.) 3 Sheets—Sheet 1.

Witnesses
Geo. E. Frech.
B. E. Seitz.

Inventor
C. E. Blue
by A. S. Pattison
Attorney

No. 679,664. Patented July 30, 1901.
C. E. BLUE.
MACHINE FOR THE MANUFACTURE OF GLASSWARE.
(Application filed Mar. 7, 1898.)
(No Model.) 3 Sheets—Sheet 3.

Witnesses
Geo. E. Frech
B. E. Seitz

Inventor
C. E. Blue,
by A. S. Pattison,
Attorney

UNITED STATES PATENT OFFICE.

CHARLES EDWIN BLUE, OF WHEELING, WEST VIRGINIA.

MACHINE FOR THE MANUFACTURE OF GLASSWARE.

SPECIFICATION forming part of Letters Patent No. 679,664, dated July 30, 1901.

Application filed March 7, 1898. Serial No. 672,889. (No model.)

*To all whom it may concern:*

Be it known that I, CHARLES EDWIN BLUE, of Wheeling, in the county of Ohio and State of West Virginia, have invented certain new and useful Improvements in Machines for the Manufacture of Glassware; and I do hereby declare the following to be a full, clear, and exact description of the invention, such as will enable others skilled in the art to which it pertains to make and use the same, reference being had to the accompanying drawings, which form part of this specification.

My invention relates to improvements in machines for the manufacture of glassware, and pertains to that class of machines in which a plurality of traveling molds are used.

One object of my present invention is to provide a machine in which separate and independent molds are moved in succession upon a support or way in contradistinction to having the molds in a fixed relation upon a carrier or movable support.

Another object of my present invention is to so construct a machine that the molds travel in one plane when in an operative position and are returned for a repeated operation by traveling in a different plane.

A further object of my invention relates to the construction and arrangement of parts, which will be fully described hereinafter and particularly referred to in the claims.

Figure 1:
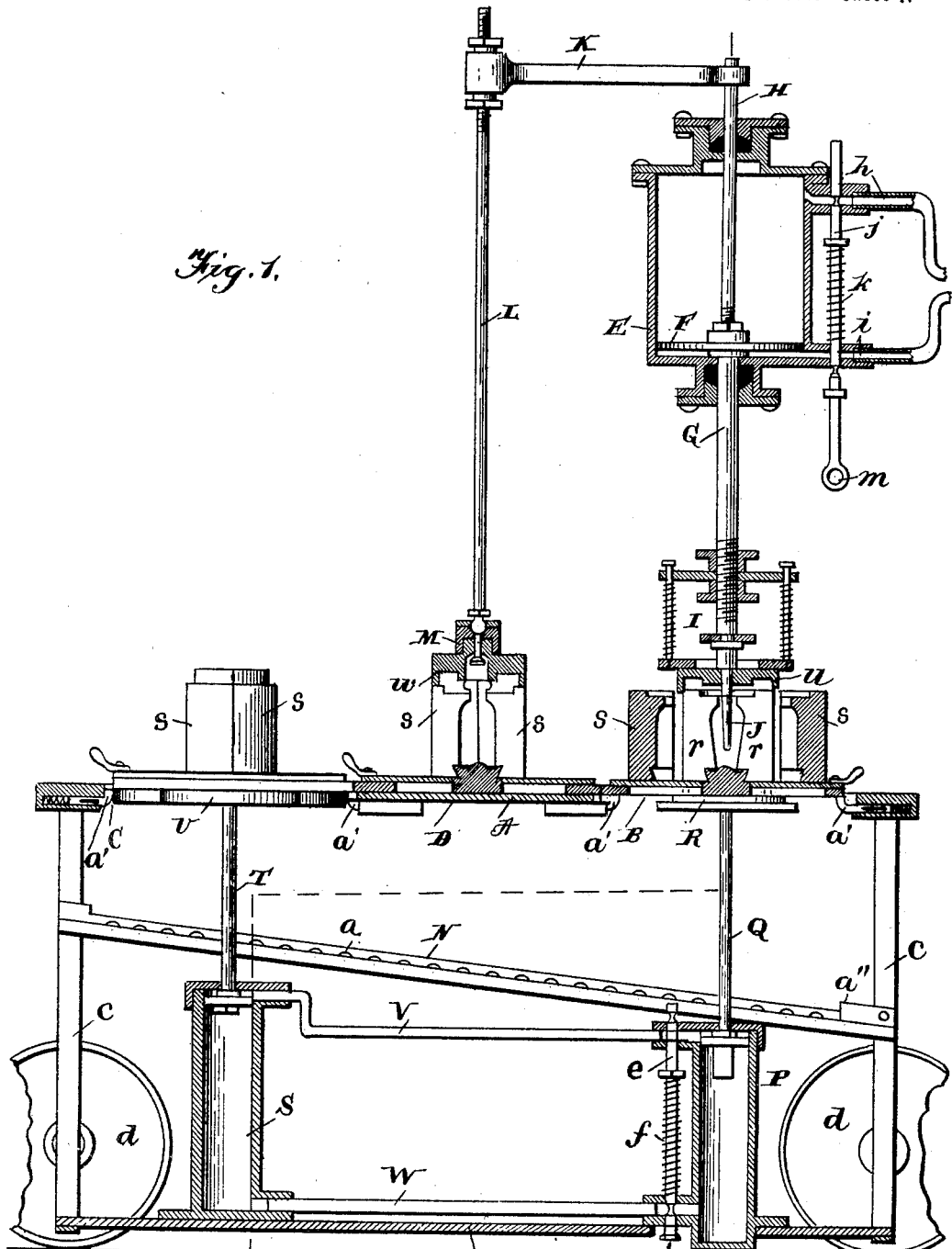
Figure 2:
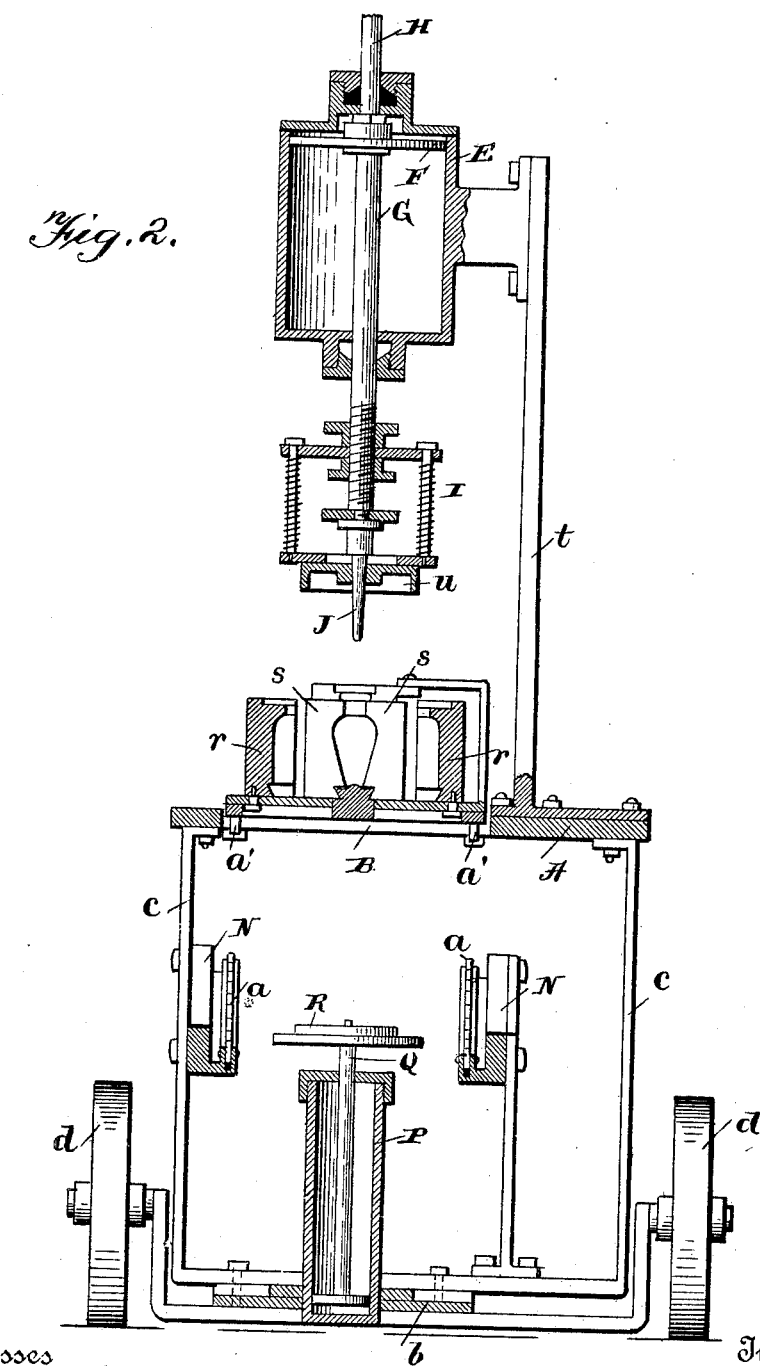
Figure 3:
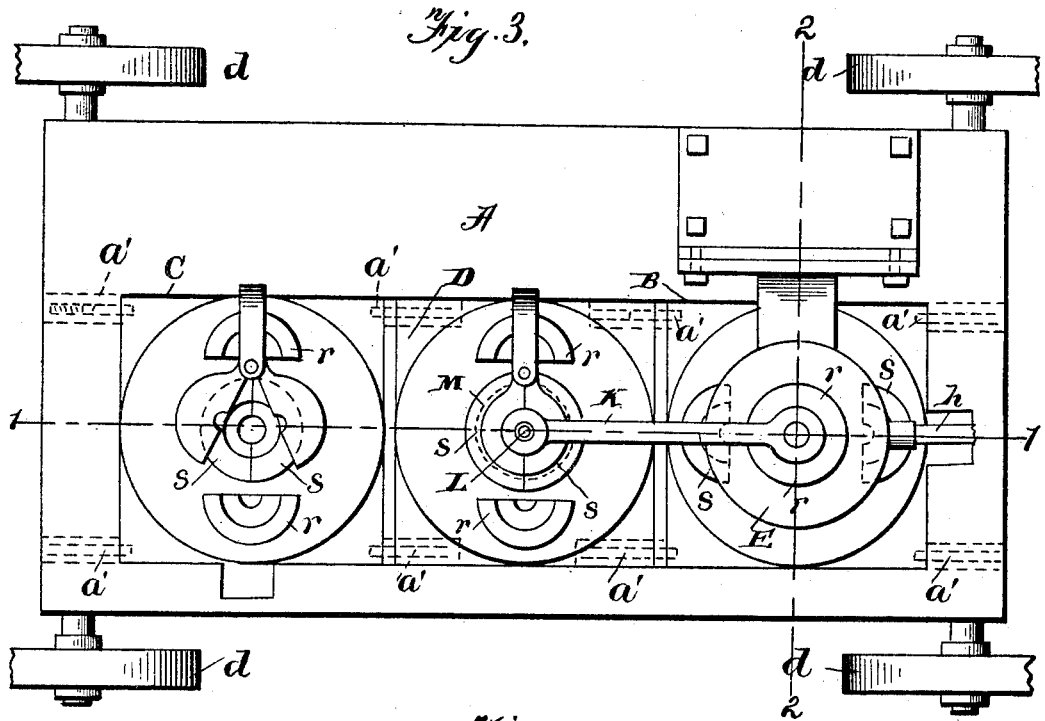
Figure 4:
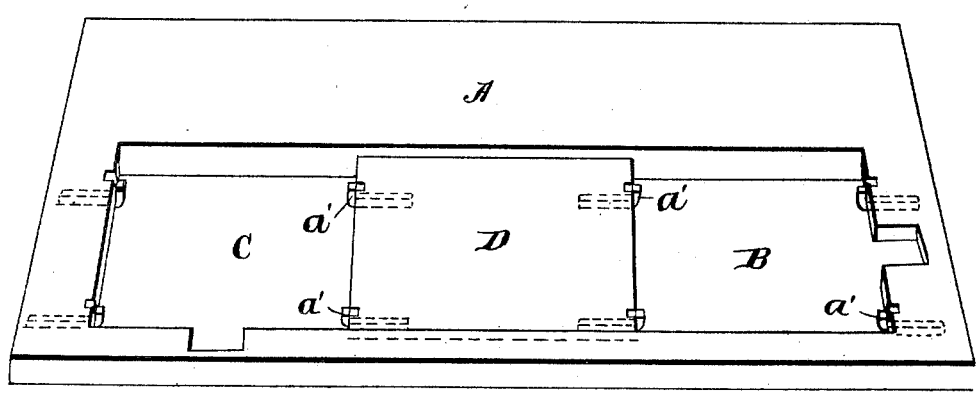
Figure 5:
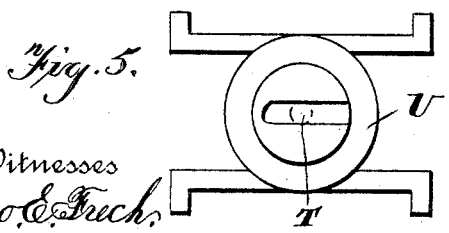
Figure 6:
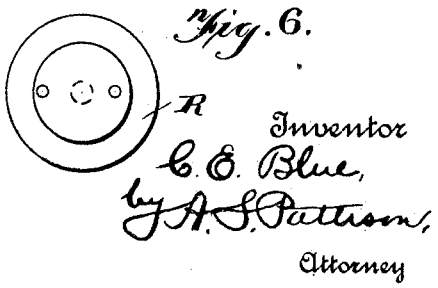

In the accompanying drawings, Figure 1 is a longitudinal vertical sectional view taken on line 1 1 of Fig. 3. Fig. 2 is a vertical transverse sectional view taken on the line 2 2 of Fig. 3. Fig. 3 is a top plan view of the machine. Fig. 4 is a detached perspective view of the operative mold support or way. Fig. 5 is a detail plan view of the table or platform carried by the piston T. Fig. 6 is a plan view of the table or platform carried by the piston Q.

Referring now to the drawings, $b$ is a base from which extend the uprights $c$, which support a moldway or support for the molds when they are being operated and which for convenience may be aptly termed an "operative" way.

The machine is supported upon the wheels $d$, whereby it is capable of being readily moved to any desired point.

The operative moldway or support A has at its receiving end an opening B, through which the molds pass, at its opposite end an opening C, through which molds are delivered, and a supporting portion D intermediate the said openings for supporting the molds in the blowing position.

E is a cylinder supported by a vertical standard $t$, attached to the machine in any desired way.

F is a piston within the cylinder, and G a piston-rod connected therewith. The upper portion H of the piston-rod passes through the upper end of the cylinder-head. The lower end of the piston carries a presser-head of the ordinary construction or any other which may be preferred, and this presser-head carries the usual plunger J. The upper end H of the piston-rod carries a laterally-extending arm K, having adjustably attached thereto a blower-head L, carrying at its lower end a blower-head M of any desired and suitable construction, or the blower-head may be worked independent of the pressing-head by treadle or otherwise.

Situated below the operative way A is a return way or support N, upon which the molds are delivered from the delivery end of the operative way A and are conveyed downward to the opposite end of the return-way N to be delivered to the receiving end of the operative way in a manner to be hereinafter described.

P is a cylinder situated beneath the delivery end of the return-way N, carrying a piston and rod Q, which has at its upper end a table or platform R, adapted to support a mold. This table R and the molds are provided, respectively, with pins and openings whereby the mold is supported and held against relative lateral movement in respect thereto. Situated below the opposite end of the return-way N is a cylinder S, carrying a piston and rod T, having at its upper end a platform or table U, also constructed with pins or openings adapted to coöperate with the molds, as previously described in respect to the platform R, for holding the molds against relative movement upon the platform when in position thereon. A pipe V establishes communication between the upper end of the cylinders S and P, and a pipe W establishes communication between the lower ends of the cylinders. Situated within these pipes V and W is a valve e, moved downward by means of a treadle g and normally held upward through the medium of a surrounding spring f. As indicated in Fig. 1, when the valve is in its upward normal position air, gas, water, or other source of power is admitted, through the pipes e' and W, to the lower end of the cylinders P and S and their pistons forced upward; but when the valve e is forced downward through the medium of the treadle or foot g air is admitted at the opposite end of the cylinders through the pipes d' and V and forces their pistons downward, or air may be used only in the up movement and gravity perform the downward stroke.

The return-way N, I have shown in the form of an inclined plane, consisting of two parallel series of rollers a, between which the cylinders S and P are situated, as clearly shown in Fig. 2. The object of having the return-way N on an incline is to cause the molds when lowered on the upper end thereof to move downward thereon by gravity to the opposite end to be carried up and delivered to the operative way A. I do not, however, consider this form of return-way as essential, and I do not therefore limit myself thereto, for any other form of support, way, or means of transporting or carrying the molds from the receiving to the delivery end of the return-way, or any means situated below the operative way whereby the molds are received from the said way and transported and carried to the opposite end thereof for the repeated operation, is within the scope of my invention.

The opening B of the operative way or support A is provided with supporting latches or members a', adapted to spring under the bases of the molds when they are elevated through the opening, and the delivery-opening C is provided with corresponding latches, which are forced backward by the platform U when it moves upward through the opening C.

Any desired form of mold may be used; but for the convenience and the better understanding of my present invention I show molds consisting of a press and a blow mold, the press-mold consisting of two parts r and the blow-mold of two parts s, the parts being adapted to be separated and brought together for the purpose of forming either a press or a blow mold. The molds forming no part of my present invention, it is not necessary to show any particular form of mold or any particular means for operating the molds, so long as it is understood that the molds consist each of a press and a blow mold.

A pipe i communicates with the lower end of the cylinder E, and the pipe h with its upper end. A valve-rod j controls the communications and is provided with a spring k, which normally holds the rod upward and normally admits air or other desired motive force below the piston F, holding the piston and presser-head normally upward. The lower end of the valve-rod j is provided with a handle m, by means of which it is drawn downward for admitting air to the upper end of the cylinder.

The mode of operation is as follows: The presser-head being normally upward, as shown in Fig 2, and the press-mold closed, a charge of molten glass is dropped within the mold. The handle m is then drawn downward, which admits the motive power above the piston, causing the plunger to descend and press the glass in the usual manner. The releasing of this handle causes the withdrawal of the presser-head to its normal position. (Shown in Fig. 2.) The presser or operator then opens the press-mold and closes the blow-mold around the depending mass of glass. The treadle g is then depressed, which admits air, gas, or other material above the pistons T and Q, causing them to be forced downward, which lowers the discharge-mold upon the incline. The mold then by gravity moves to the lower end of the incline and is stopped in the proper position over the cylinder P through the medium of a stop a''. The operator then moves the mold from the pressing to the blowing position and in doing so forces the preceding mold from the blowing position to the discharging position, which is held by means of the catches in the opening C. The operator's foot is then removed from the treadle g and the two pistons ascend, the piston Q carrying the mold up through the feeding-opening B upon the operative way A, and it is caught by the catches in said opening. The simultaneous movement upward of the piston T through the medium of its platform U forces the catches out of contact with the mold in the discharging position, and the machine is ready for a repetition of the operation. The bases of the molds being either in direct contact, as shown in Fig. 1, or through the medium of shoulders or projections, the movement of the mold from the pressing to the blowing position forces the mold from the blowing to the discharging position, and the mold in the discharging position striking the rear end of the way A limits the movements of the molds and causes them to be in the proper relative position to receive the pressing and the blowing heads when they are caused to be lowered, the two heads being situated a distance apart equal to the width of the molds, as will be readily understood.

From the preceding description it will be seen that a simple machine is produced and one capable of rapid manipulation.

I do not limit myself to the construction here shown for returning the molds from the delivery end of an operative way to the receiving end of a return-way, for this may be varied without departing from the spirit and scope of my invention, which essentially pertains to any means whereby the molds are taken from the delivery end of the operative way and returned to the receiving end thereof for a repeated operation.

Having thus fully described my invention, what I claim, and desire to secure by Letters Patent, is—

1. A machine for the manufacture of glassware, comprising a support adapted to receive a plurality of molds, and a plurality of disconnected molds movable in succession upon said support.

2. A machine for the manufacture of glassware, comprising a support adapted to receive a plurality of molds, a plurality of disconnected molds movable in succession upon the support, the support constructed at one end to receive and at the opposite end to permit the molds to pass therefrom, and a glass-forming mechanism coacting with the mold.

3. A machine for the manufacture of glassware, comprising a support adapted to receive a plurality of molds, a plurality of molds movable in succession upon and independent of said support, means for holding the molds a predetermined distance apart, a press-head and a blow-head supported apart a distance equal to the predetermined distance of the molds whereby the heads will engage the molds.

4. A machine for the manufacture of glassware, comprising a support, a plurality of disconnected molds movable in succession upon said support, the movement of one mold effecting a corresponding movement of the other mold or molds, and a glass-forming mechanism coacting with the molds.

5. A machine for the manufacture of glassware, comprising a support adapted to receive a plurality of molds, a plurality of independent molds movable in succession upon said support, one mold abutting against its succeeding mold, whereby the movement of the rear mold effects a movement of the succeeding mold or molds, and a glass-forming mechanism coacting with the molds.

6. A machine for the manufacture of glassware comprising a support adapted to receive a plurality of molds, a press and a blow mold movable in succession upon and independent of said support, the two molds engaging for holding them a predetermined distance apart and whereby a movement of the press-mold effects a corresponding movement of the blow-mold, and a press and a blow head supported a distance apart equal to the distance between the molds for the purpose described.

7. A machine for the manufacture of glassware comprising a plurality of disconnected molds supported and moved in operative position in one plane, and returned to operative position upon a different plane, and a glass-forming mechanism in the operative plane and coacting with the molds.

8. A machine for the manufacture of glassware comprising a plurality of disconnected molds, an operative way in one plane and a return-way in a different plane, and a glass-forming mechanism coacting with the molds in the operative plane.

9. A machine for the manufacture of glassware comprising a plurality of molds, an operative way in one plane, a return-way in a different plane, the return-way receiving the molds from the rear end of and delivering them for the front end of the operative way.

10. A machine for the manufacture of glassware comprising a plurality of independent molds, an operative way, a return-way situated therebelow, the front end of the return-way being in a vertical line below the rear end of the operative way and its rear end in a vertical line below the front end of the operative way.

11. A machine for the manufacture of glassware comprising an operative way, a return-way therebelow, a plurality of molds, and means for taking the molds from one way and delivering them to the other way.

12. A machine for the manufacture of glassware comprising an operative way, a return-way therebelow, a plurality of molds, a mold-lowering member at the receiving end of the return-way, and a mold-raising member at the delivery end of the way.

13. A machine for the manufacture of glassware comprising an operative way, a return-way therebelow, a plurality of molds, a mold-lowering member at the receiving end and a mold-raising member at the delivery end of the return-way, and means for simultaneously operating said lowering and raising members.

14. A machine for the manufacture of glassware comprising an operative way, a return-way therebelow, a plurality of molds, a mold-lowering member at the receiving end of and a mold-raising member at the delivery end of the return-way, and means for moving said members simultaneously in the same direction.

15. A machine for the manufacture of glassware comprising an operative way, a return-way therebelow, a plurality of molds, a mold-lowering member at the receiving end and a mold-raising member at the delivery end of the return-way, and a single member controlling the lowering and raising members.

16. A machine for the manufacture of glassware, comprising an operative way, a return-way therebelow, a plurality of molds, the operative way having openings therein through which it receives the molds from and delivers them to the return-way.

17. A machine for the manufacture of glassware comprising an operative way, a return-way therebelow, a plurality of molds, the operative way having openings therein through which it receives the molds from and delivers them to said return-way, and elevating and lowering members situated respectively under and registering with said openings.

18. A machine for the manufacture of glassware comprising an operative way, a return-way therebelow, a plurality of molds, the operative way having openings through which said molds are delivered to and received from said return-way, the openings having catches for supporting the molds therein, and operating members for said molds adapted to move the catches for releasing the molds.

19. A machine for the manufacture of glassware, comprising an operative way, a plurality of independent molds movable upon said way, and a return-way adapted to receive said molds and declining toward the receiving end of said operative way.

20. A machine for the manufacture of glassware comprising an operative way, a plurality of independent molds movable upon said way, a return-way situated below the operative way and declining toward the receiving end of the operative way for the purpose described.

21. A machine for the manufacture of glassware comprising an operative way, a plurality of independent molds movable upon said way, and a return-way constructed and adapted to carry said molds from the receiving to its delivery end.

22. A machine for the manufacture of glassware comprising a straight operative way, a plurality of independent molds movable upon said way, and means for returning said molds to the receiving end of the operative way.

23. A machine for the manufacture of glassware comprising an operative way having a receiving end and a delivery end, a plurality of independent molds movable upon said way, a presser-head situated at the receiving end of the way, and a blow-head situated intermediate the ends of the way.

24. A machine for the manufacture of glassware comprising an operative way having a receiving-opening at one end and a delivery-opening at the opposite end, a presser situated over the receiving-opening and a blower situated at a point intermediate the openings.

25. A machine for the manufacture of glassware comprising a plurality of independent molds, an operative way adapted to receive and deliver said molds, an incline return-way situated below said operative way and provided with rollers which receive, support and upon which the molds travel by gravity upon said way.

26. A machine for the manufacture of glassware comprising a plurality of independent molds, an operative way adapted to receive and deliver said molds, a return-way situated below the operative way and consisting of parallel mold-supports, and elevating and lowering members for the molds moving between said rails.

27. A machine for the manufacture of glassware comprising a plurality of independent molds, an operative way adapted to receive and deliver said molds, and a return-way consisting of two parallel inclined series of rollers upon which the molds travel by gravity.

28. A machine for the manufacture of glassware comprising a plurality of independent molds, an operative way adapted to receive and deliver said molds, and a gravity-acting return-way for the molds.

29. A machine for the manufacture of glassware comprising a plurality of molds, an operative way, a return-way, a cylinder situated under each end of said ways, pistons therefor adapted to respectively lift and lower said molds from and to the return-way, a source of power having connection with said cylinders, and a controller common to both cylinders.

30. A machine for the manufacture of glassware comprising a plurality of molds, an operative way, a return-way, a cylinder situated under each end of said ways, pistons therefor adapted to respectively lift and lower said molds from and to the return-way, a source of power having communication with said cylinders, and a controller constructed to simultaneously establish communication with corresponding ends of said cylinders.

31. A machine for the manufacture of glassware, comprising an operative way adapted to receive and deliver molds, a return-way adapted to receive and deliver molds, a lifting member at the delivery end of said return-way, the return-way having a stop situated to hold the mold over said lifting member.

32. A machine for the manufacture of glassware comprising a cylinder, a piston therefor, a piston-rod connected with said piston and projecting through both ends of the cylinder, a presser-head connected with one end of said rod, and a blow-head connected with the other end of said rod.

33. A machine for the manufacture of glassware comprising an operative way, a return-way, a plurality of independent molds movable upon said operative way, an elevating member for said molds, said member and molds having interlocking members.

34. A machine for the manufacture of glassware comprising a support adapted to receive a plurality of molds, and a plurality of molds independently movable upon said support in succession and independently movable laterally in respect to said support.

35. A machine for the manufacture of glassware comprising a support adapted to receive a plurality of molds, a plurality of open and shut molds movable in succession upon said support, the molds having abutting members serving to separate them and to cause the movement of one mold to effect the movement of the succeeding molds.

36. A machine for the manufacture of glassware comprising a plurality of independent molds supported and moved in operative position in one plane and independently returned to operative position upon a different plane, and a glass-forming mechanism in the operative plane and coacting with the mold.

37. A machine for the manufacture of glassware comprising an operative way in one plane and a return-way in a different plane, a plurality of independent molds supported and moved in operative position upon the operative way and returned to operative position upon the return-way, and a glass-forming mechanism coacting with the molds in the operative plane.

38. A glass-forming machine comprising a mold-support, a press-mold vertically movable in respect to said support to carry it to the pressing position, a pressing mechanism adapted to coact with said press-mold, a blow-mold supported by said support, and a vertically-movable blowing mechanism adapted to coact with the supported blow-mold.

39. A glass-forming machine comprising a pressed-blank-supporting track, a vertically-movable piston located below the way, a press-mold movable vertically through said way by said piston, a pressing mechanism, a blowing mechanism, a pressed-blank support movable upon said track from the pressing to the blowing position, and pressing and blowing mechanisms coöperating respectively with the press and blow molds.

In testimony whereof I affix my signature, in presence of two witnesses, this 3d day of March, 1898.

CHARLES EDWIN BLUE.

Witnesses:
   Louis Vance Blue,
   W. B. Jones.